_(12)_ United States Patent
Dolan

(10) Patent No.: US 9,944,226 B2
(45) Date of Patent: Apr. 17, 2018

(54) MODIFIED MARKER LIGHT AS MULTI-FUNCTION VEHICLE LIGHT

(71) Applicant: Robert A Dolan, Gilbert, AZ (US)

(72) Inventor: Robert A Dolan, Gilbert, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 14/499,830

(22) Filed: Sep. 29, 2014

(65) Prior Publication Data

US 2015/0016138 A1 Jan. 15, 2015

Related U.S. Application Data

(62) Division of application No. 12/581,662, filed on Oct. 19, 2009, now Pat. No. 8,845,159.

(60) Provisional application No. 61/107,531, filed on Oct. 22, 2008.

(51) Int. Cl.
*B60Q 1/26* (2006.01)
*B60Q 1/44* (2006.01)
*B60Q 1/32* (2006.01)
*B60Q 1/00* (2006.01)
*B60Q 1/30* (2006.01)

(52) U.S. Cl.
CPC .......... *B60Q 1/441* (2013.01); *B60Q 1/0088* (2013.01); *B60Q 1/2696* (2013.01); *B60Q 1/30* (2013.01); *B60Q 1/32* (2013.01); *B60Q 1/44* (2013.01)

(58) Field of Classification Search
CPC ...... B60Q 1/26; B60Q 1/2607; B60Q 1/2696; B60Q 1/30; B60Q 1/32; B60Q 1/44; B60Q 1/441; B60Q 1/442; B60Q 1/444
USPC .......... 362/487, 493–507, 540–549
See application file for complete search history.

(56) References Cited

U.S. PATENT DOCUMENTS 4,791,401 A * 12/1988 Heidman, Jr. ...... B60R 25/1003
340/475

* cited by examiner

*Primary Examiner* — Jason Moon Han
(74) *Attorney, Agent, or Firm* — Richard E. Oney; Tiffany & Bosco, P.A.

(57) ABSTRACT

A light assembly includes a housing adapted for mounting on a vehicle, wherein the housing includes a brake light input coupled to the light source and a marker light input coupled to the light source. An electrical circuit is configured to energize the light source at a brightness suitable for an identification lamp when at least one headlight of the vehicle is illuminated and also is configured to energize the light source at a brightness suitable for a stop lamp when the vehicle brake is applied, whether or not the identification lamp is energized. In this configuration, the can function as an identification light and as a center high mount stop light (CHMSL).

21 Claims, 12 Drawing Sheets

MODIFIED MARKER LIGHT CIRCUIT 103

MODIFIED MARKER LIGHT AS MULTI-FUNCTION VEHICLE LIGHT

RELATED APPLICATION(S)

This application is a divisional of and claims the priority of U.S. non-provisional patent application Ser. No. 12/581,662, filed Oct. 19, 2009, entitled "Modified Marker Light As Multi-Function Vehicle Light," which is incorporated herein by reference. This application claims priority of, and incorporates by reference, U.S. provisional patent application Ser. No. 61/107,531 (filed Oct. 22, 2008 and entitled Modified Marker Light As Multi-Function Vehicle Light).

FIELD OF INVENTION

The present invention generally relates to a vehicle light, and more particularly, to a system, method, and apparatus for configuring a marker light to function as one or more of a marker light, Center High Mount Stop Lamp (CHMSL), or brake light.

BACKGROUND

A marker light or device on a vehicle promotes visibility to the vehicle. The marker light is typically located on the sides of vehicles less than 80 inches wide and on the back and sides of vehicles greater than 80 inches wide.

A Center High Mount Stop Lamp (or Light) (CHMSL) is a central brake lamp (or light) on a vehicle that is typically mounted higher than the left and right brake lamps on the vehicle. The CHMSL (also known as center brake lamp, third brake lamp, eye-level brake lamp, safety brake lamp, high-level brake lamp, Dole light, or Liddy light) is required in some countries.

In the past, one or more marker lights or devices (e.g., located on the back of the vehicle) and a standard stop light (e.g., located near the lower rear end of the vehicle) have been used on various vehicles. The U.S. government, for example, has required that all vehicles under 80 inches wide have a CHMSL. See Title 49 of the Code of Federal Regulations, Chapter V, Section 571.108, which is incorporated by reference. All vehicles 80 inches or more wide do not require a CHMSL, but require three high mount marker lights in the center at the top of the vehicle.

It is desirable to improve the marker lights, CHMSLs, and brake lights that already exist on most vehicles.

SUMMARY

Exemplary embodiments of the present invention include a system, method, and apparatus for configuring a marker light to function as one or more of a marker light, Center High Mount Stop Lamp (CHMSL), or brake light such as:

A system, method, and apparatus for using a modified marker light to control the function of one or more of a marker light, Center High Mount Stop Lamp (CHMSL), and brake light. An exemplary embodiment of a modified marker light of the present invention includes an input to one or more marker lights, an input to a. CHMSL, and a ground. The modified marker light allows for individual or simultaneous use of the marker light(s), Center High Mount Stop Lamp (CHMSL)(s), and brake lights using circuitry in the modified marker light.

An apparatus including a modified marker light configured to include a first input coupled to a first light, a second input coupled to a second light, and a third input coupled to a ground, where the modified marker light is configured to function as one or more marker lights, a CHMSL, and a brake light.

The apparatus above where the first light includes a CHMSL and the second light includes one or more marker lights.

The apparatus above where the CHMSL functions as a marker light.

The apparatus above where the first light includes at least one of a marker light, a CHMSL, a brake light, a running light, a turn signal light, a tail light, and a headlight and the second light includes at least one of a marker light, a CHMSL, a brake light, a running light, a turn signal light, a tail light, and a headlight.

The apparatus above where the modified marker light controls the function of at least one of the one or more marker lights, a CHMSL, a brake light, a running light, a turn signal light, a tail light, and a headlight.

A method including the steps of configuring one modified marker light to function as one or more of a marker light, a CHMSL, and a brake light; and configuring the modified marker light to illuminate as one or more of the marker light, the CHMSL, and the brake light when at least one of: the one or more marker lights are not energized; and the one or more marker lights are energized.

The method above further including at least one of configuring the modified marker light to illuminate as one or more of the marker light, the CHMSL, and the brake light upon a driver using the brake of the vehicle when the one or more marker lights are energized; and configuring the modified marker light to illuminate as one or more of the marker light, the CHMSL, and the brake light upon a driver using the brake of the vehicle when the one or more marker lights are energized.

A method including the steps of configuring a modified marker light to communicate with a CHMSL, one or more marker lights, and a ground; and at least one of: configuring the modified marker light to illuminate as a CHMSL upon a driver using a brake of a vehicle when the one or more marker lights are not energized; and configuring one or more light emitting diodes associated with the modified marker light to energize upon a driver using a brake of a vehicle when the one or more marker lights are energized.

The method above further including configuring the one or more light emitting diodes associated with the modified marker light to illuminate brighter upon the driver using the brake of the vehicle when the one or more marker lights are already illuminated.

The method above where the CHMSL is a brake light.

A method including the steps of configuring a modified marker light to function as one or more of a CHMSL, one or more marker lights, and a brake light; configuring the modified marker light to function as one or more marker lights when one or more headlights are illuminated; and at least one of: configuring the modified marker light to function as a CHMSL upon a driver using a brake of a vehicle when the one or more marker lights are not functioning as marker lights; and configuring the modified marker light to function as a CHMSL upon a driver using a brake of a vehicle when the one or more marker lights are functioning as marker lights.

A method including the steps of configuring a modified marker light to function as one or more of a CHMSL, one or more marker lights, and a turn signal light; configuring the modified marker light to function as one or more marker lights when one or more headlights are illuminated; and at least one of: configuring the modified marker tight to function as a turn signal light upon a driver using a turn signal of a vehicle when the one or more marker lights are not functioning as marker lights; and configuring the modified marker light to function as a turn signal light upon a driver using a turn signal of a vehicle when the one or more marker lights are functioning as marker lights.

BRIEF DESCRIPTION OF THE DRAWINGS

Exemplary embodiments of the present invention are described in the context of the appended drawing figures, where like numerals designate like elements.

DETAILED DESCRIPTION

It is desirable to improve the marker lights, CHMSLs, and brake lights that already exist on most vehicles. The present invention adds a safety feature to such vehicles by incorporating circuitry into a marker light to allow the marker light to function as one or more of a marker light, a CHMSL, and/or a brake light to aid in warning any drivers behind the vehicle of any braking or slowing down of the vehicle in front of them.

Figure 1:
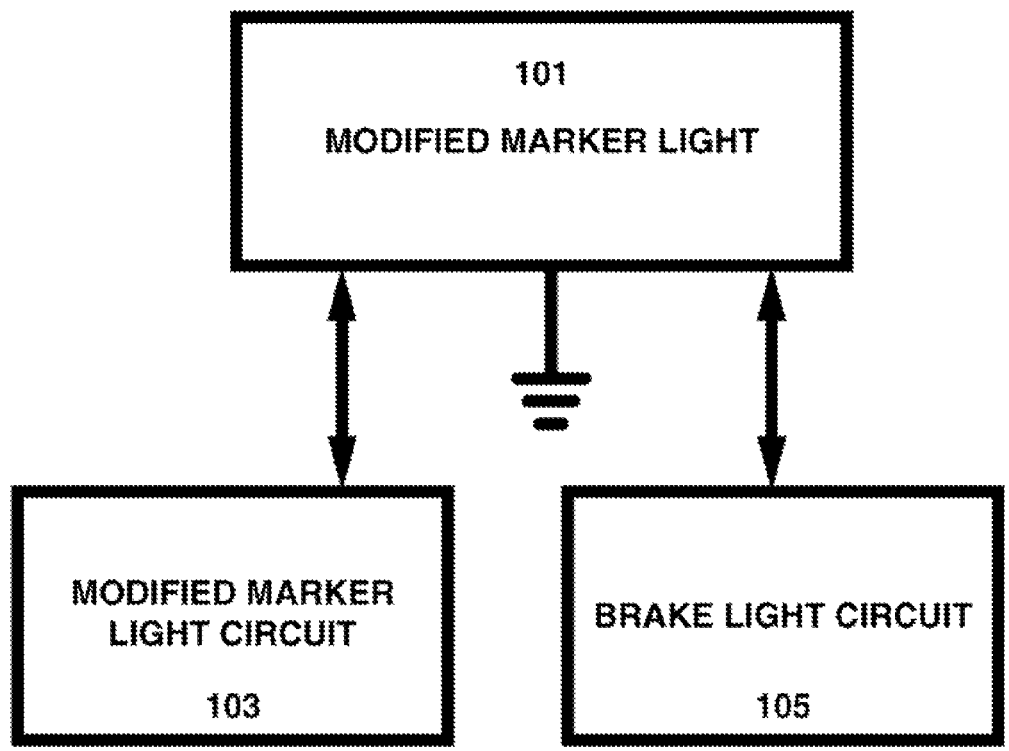
FIG. 1 illustrates an apparatus in accordance with an exemplary embodiment of the present invention.
Figure 2:
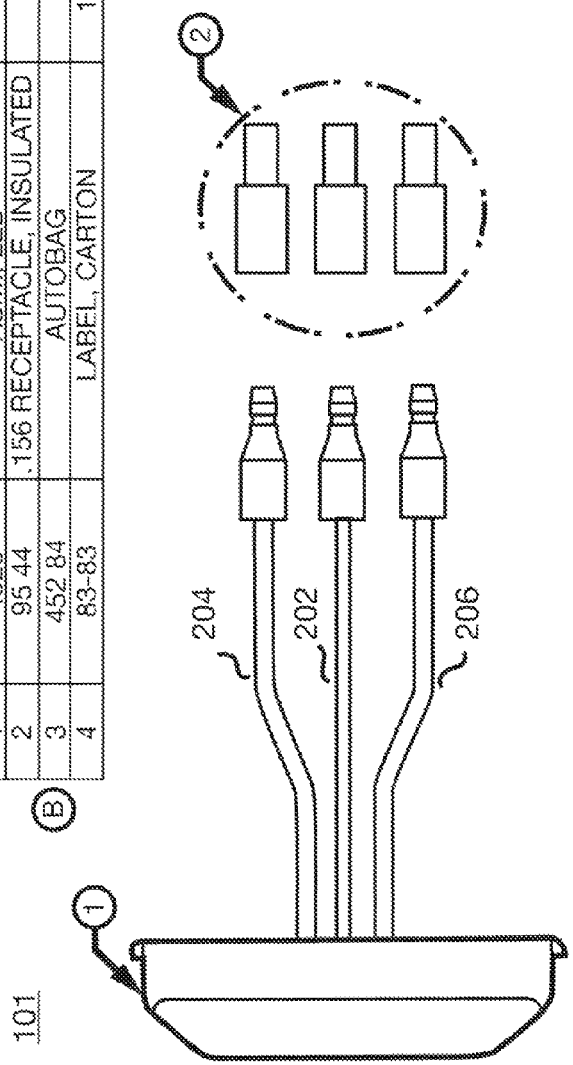
FIG. 2 illustrates an apparatus in accordance with an exemplary embodiment of the present invention.
Figure 3:
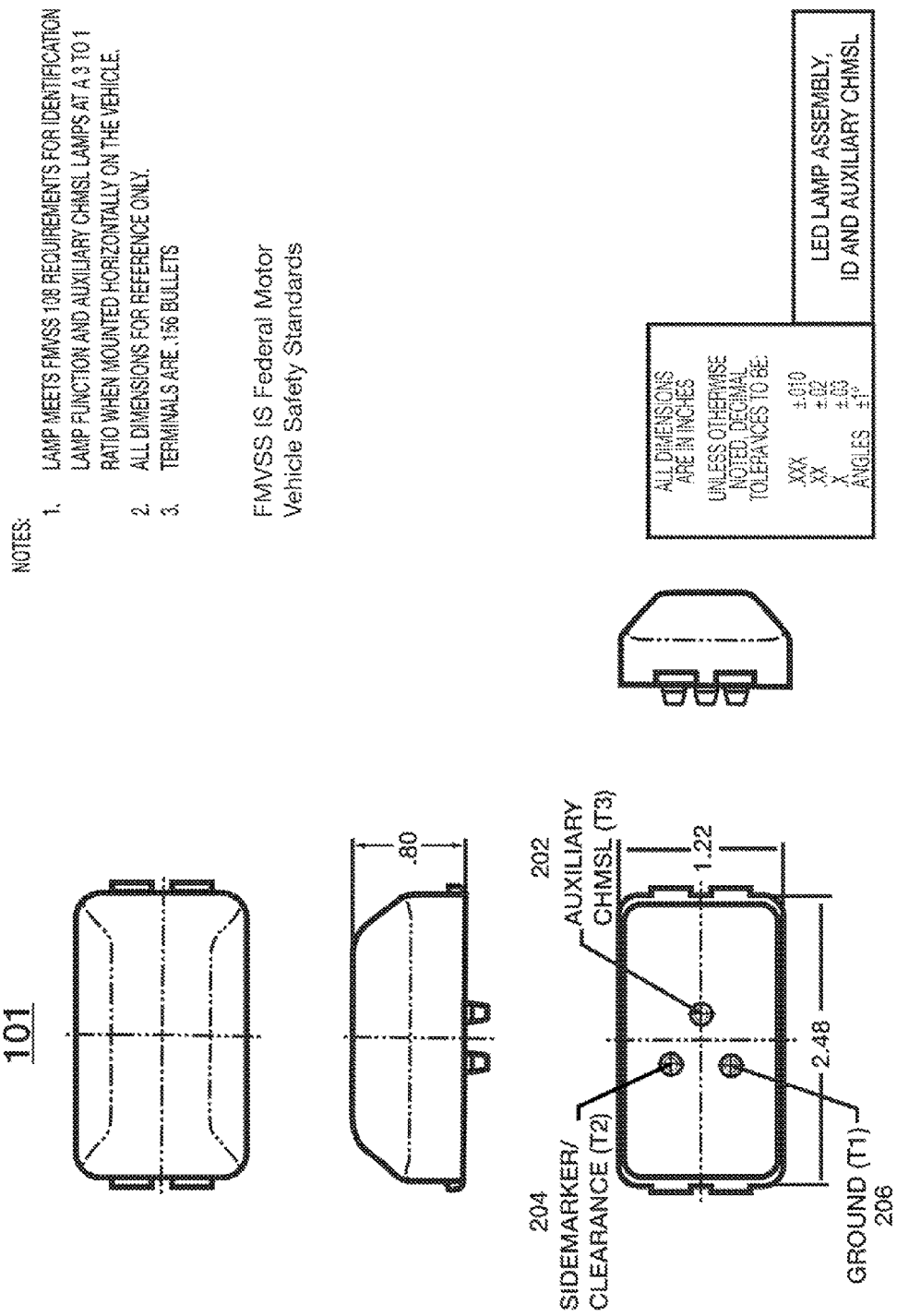
FIG. 3 illustrates an apparatus in accordance with an exemplary embodiment of the present invention.
Figure 4:
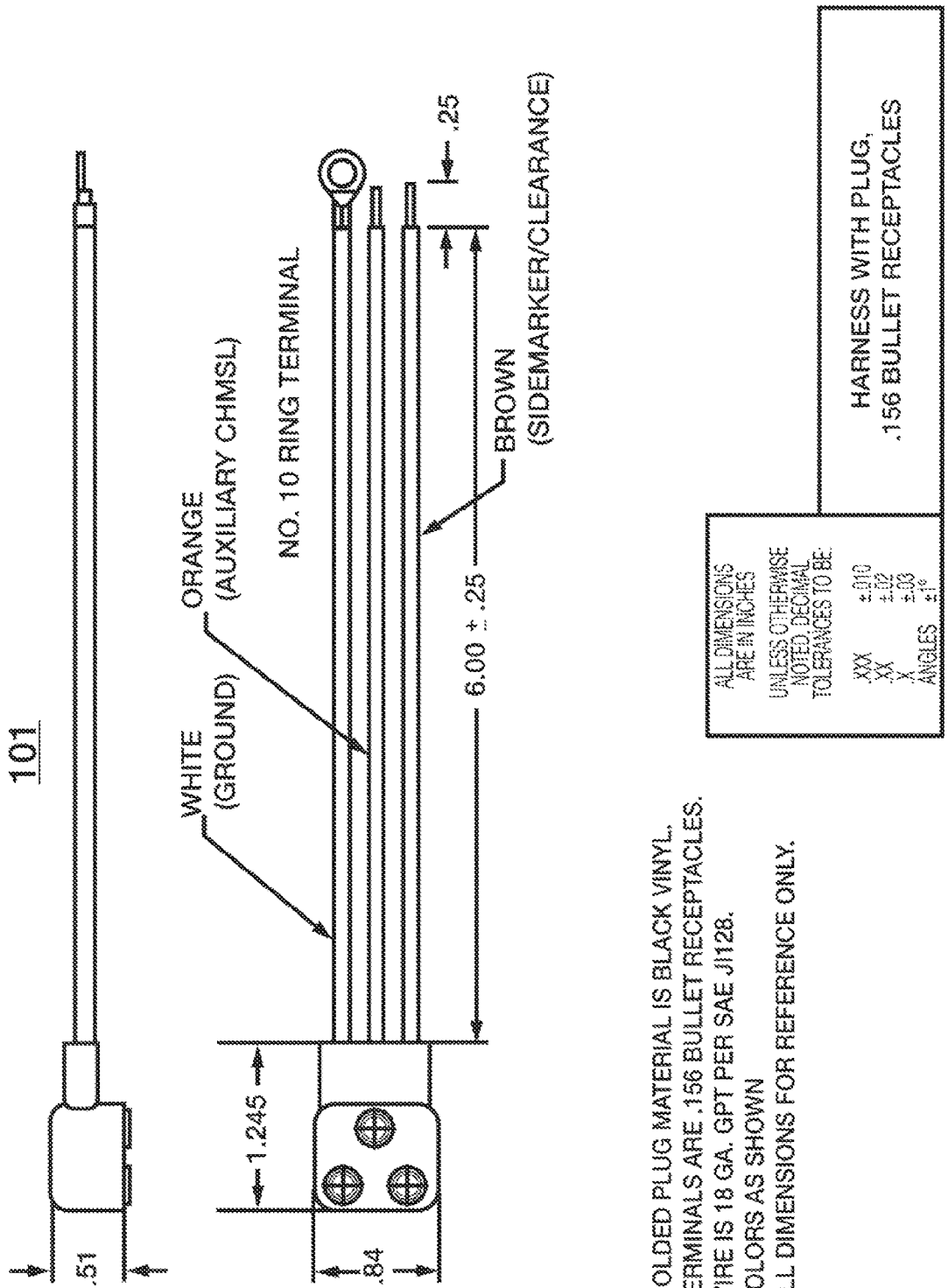
FIG. 4 illustrates an apparatus in accordance with all exemplary embodiment of the present invention.
Figure 11:
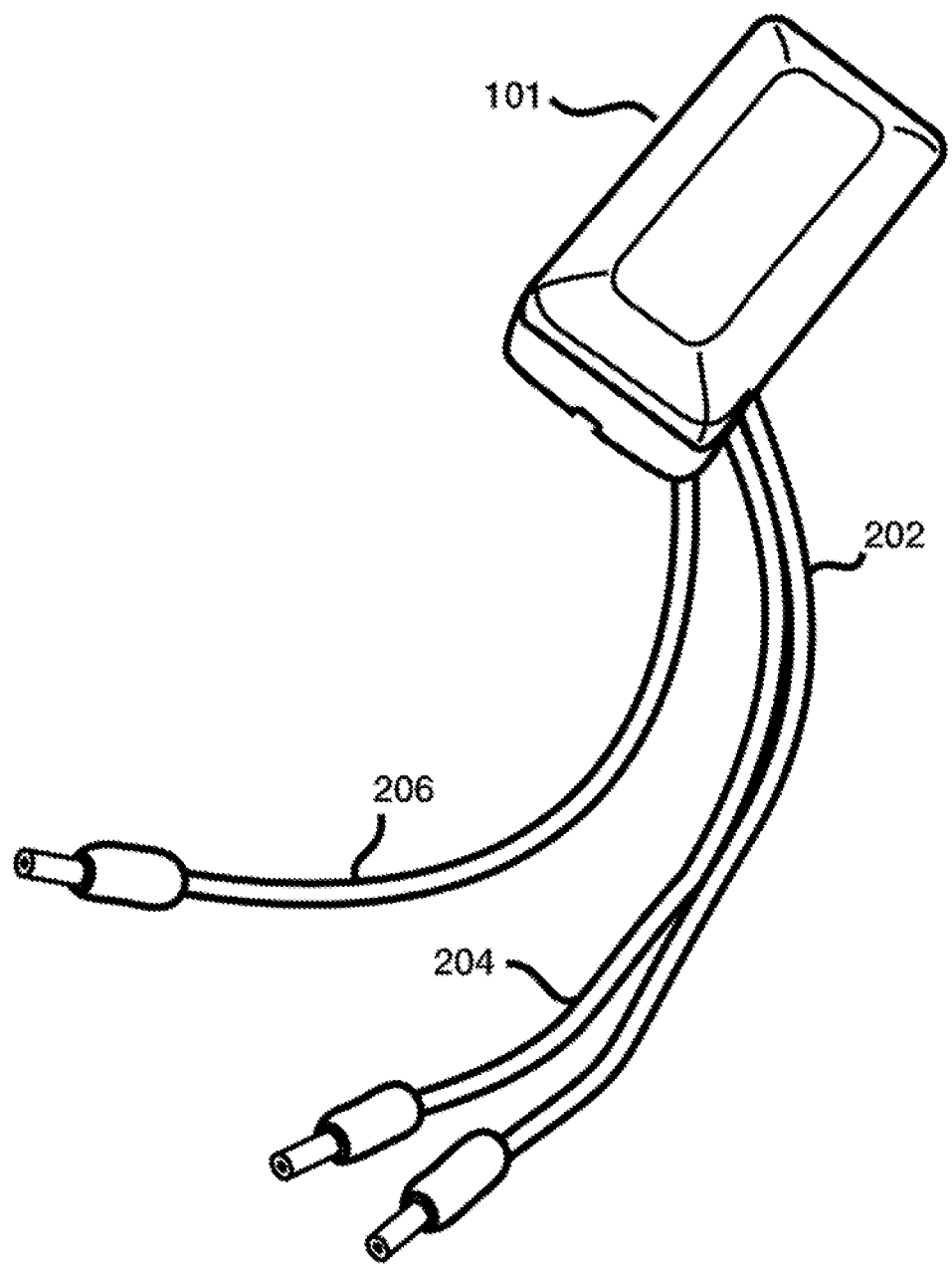
FIG. 11 illustrates a modified marker light circuitry in accordance with an exemplary embodiment of the present invention.
Figure 12:
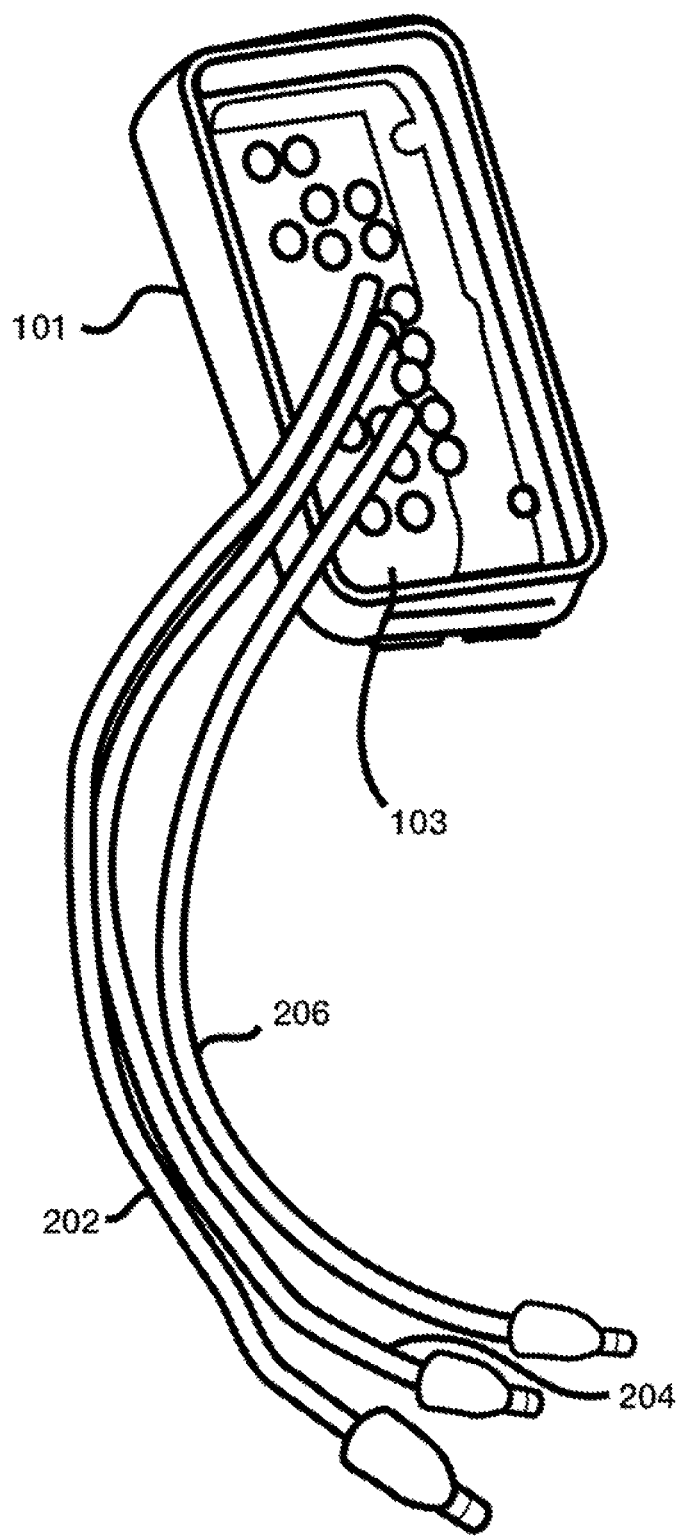
FIG. 12 illustrates a modified marker light circuitry in accordance with an exemplary embodiment of the present invention.

In an exemplary embodiment of the present invention, even though not required by law at this time, by modifying the marker light to control the function of one or more of a marker light, CHMSL, or brake light for vehicles less than, greater than, or equal to 80 inches wide, all vehicles can easily include marker lights, CHMSLs, and brake lights without the need to add CHMSLs (which vehicles greater than or equal to 80 inches do not currently have). In addition, for vehicles less than 80 inches wide, the CHMSL can be replaced by a modified marker light 101 of FIGS. 1, 11, and 12 of the present invention, so that such vehicles can include one light that functions as both a CHMSL and a marker light. By adding modified marker light 101 of the present invention, every vehicle that does not have a CHMSL can have a CHMSL without the need to add an additional light or LED. By adding the function of a CHMSL to all vehicles, a driver behind the vehicle receives additional warning of the vehicle braking. By adding modified marker light 101 of the present invention, every vehicle that does not have a marker light can have a marker light without the need to add an additional light or LED. By adding the function of a marker light to all vehicles, a driver ahead of the vehicle or otherwise near the vehicle receives additional warning of the vehicle ahead or near it. The terms "marker light" or "modified marker light" can include at least one of a marker light, a CHMSL, a brake light, a turn signal light, a running light, a tail light, a head light, or any other type of light used on a vehicle (or a plurality of these).

The present invention includes configuring modified marker light 101 to control the function of one or more of a marker light (not shown), Center High Mount Stop Lamp (CHMSL) (not shown and brake light (not shown). Modified marker light 101 consolidates and improves the function of these lights, which increases visibility of a vehicle (not shown) and promotes vehicular safety. Modified marker light 101 has circuitry 103 that can be incorporated into the circuitry of a typical marker light, a Center High Mount Stop Lamp (or Light) (CHMSL), and/or a brake light of a vehicle. Modified marker light 101 has circuitry 103 that can energize a typical marker light, CHMSL, and/or brake light when the vehicle stops, brakes, or slows down without the need to add a CHMSL to vehicles that do not have a CHMSL. Modified marker light 101 can be used with vehicles and/or trucks that are greater than less than, or equal to 80 inches in width.

Using circuitry 103 in modified marker light 101, a high mount stop light (e.g., CHMSL), marker light, and/or brake light is multi-functional compared to a traditional marker light, brake light, or CHMSL on a vehicle. Modified marker light 101 allows for additional warning signals to people following the vehicle to have more time for braking and/or stopping. For example, marker lights are typically not turned on, unless the headlights of a vehicle are turned on. However, with modified marker light 101, when a driver activates the brakes, modified marker light 101 functions as a CHMSL even for a vehicle that does not have a CHMSL. In other words, for vehicles that do not have a CHMSL, but have modified marker light 101, modified marker light 101 can function as a marker light, a CHMSL, or both without having to add additional lights or light emitting diodes (LEDs) to a vehicle. Modified marker light 101 can meet the federal U.S. legal requirements for marker lights (e.g., for vehicles equal to or greater than 80 inches in width), meet the federal U.S. legal requirements for CHMSLs (e.g., for vehicles less than 80 inches in width), and allow for universal operation of brake lights, all using the same circuitry 103 in modified marker light 101.

In an exemplary embodiment, if headlights of a vehicle are on (e.g., via a running light circuit (not shown)) and the driver activates the brakes (not shown) on the vehicle (e.g., using a brake light circuit 105), circuitry 103 of modified marker light 101 allows for marker lights (that may already be illuminated) to illuminate brighter as a warning to a vehicle behind this driver. In an exemplary embodiment, if headlights of a vehicle are off and the driver activates the brakes on the vehicle (e.g., using the brake light circuit), modified marker light 101 allows for marker lights (that may not be illuminated) to illuminate as a CHMSL as a warning to a vehicle behind this driver. In an exemplary embodiment, circuitry 103 for a CHMSL can be incorporated into the existing circuitry of a marker light to create modified marker light 101 to allow for a CHMSL to be used for vehicles greater than or equal to 80 inches wide without adding an additional light or LED.

This universal functionality of modified marker light 101 to be used as a typical marker light, a CHMSL, or both without the need for adding any additional lights or LEDs to a vehicle: 1) enhances safety by warning a driver that a vehicle is slowing down or stopping in front of the driver and 2) is cost efficient by removing the need for vehicles without a CHMSL to add a CHMSL to the vehicle. In the past, only vehicles under 80 inches in width required a CHMSL and only vehicles greater than or equal to 80 inches in width required marker lights. As such, substantially all vehicles greater than or equal to 80 inches in width do not have a CHMSL. In this way, one light has been used as a marker light, but a light would need to be added to such vehicles to function as a CHMSL. Modified marker light 101 with functionality of both the CHMSL and marker lights provides a universal control that can be used on substantially all vehicles. Using this modified marker light 101, vehicles can have one light to function as marker lights, CHMSLs, and/or brake lights that can operate individually or simultaneously without the need for adding additional lights or LEDs to a vehicle. Modified marker light 101 allows for multi-use lights that can increase visibility of the vehicle to other drivers or passengers when the driver is stopping or braking without the need for multiple lights or LEDs on the vehicle.

In an exemplary embodiment, in FIGS. 2-4, 11, and 12, modified marker light 101 includes three prongs, one prong 202 for coupling to a CHMSL (or brake light), a second prong 204 for coupling to one or more marker lights (or marker light circuitry), and a third prong 206 for coupling to ground. Modified marker light 101 includes a first input 202 (e.g., e.g., high mount stop light input) coupled to a CHMSL (and/or brake light), a second input 204 (e.g., marker light input) coupled to one or more marker lights, and a third input 206 coupled to ground.

Figure 5:
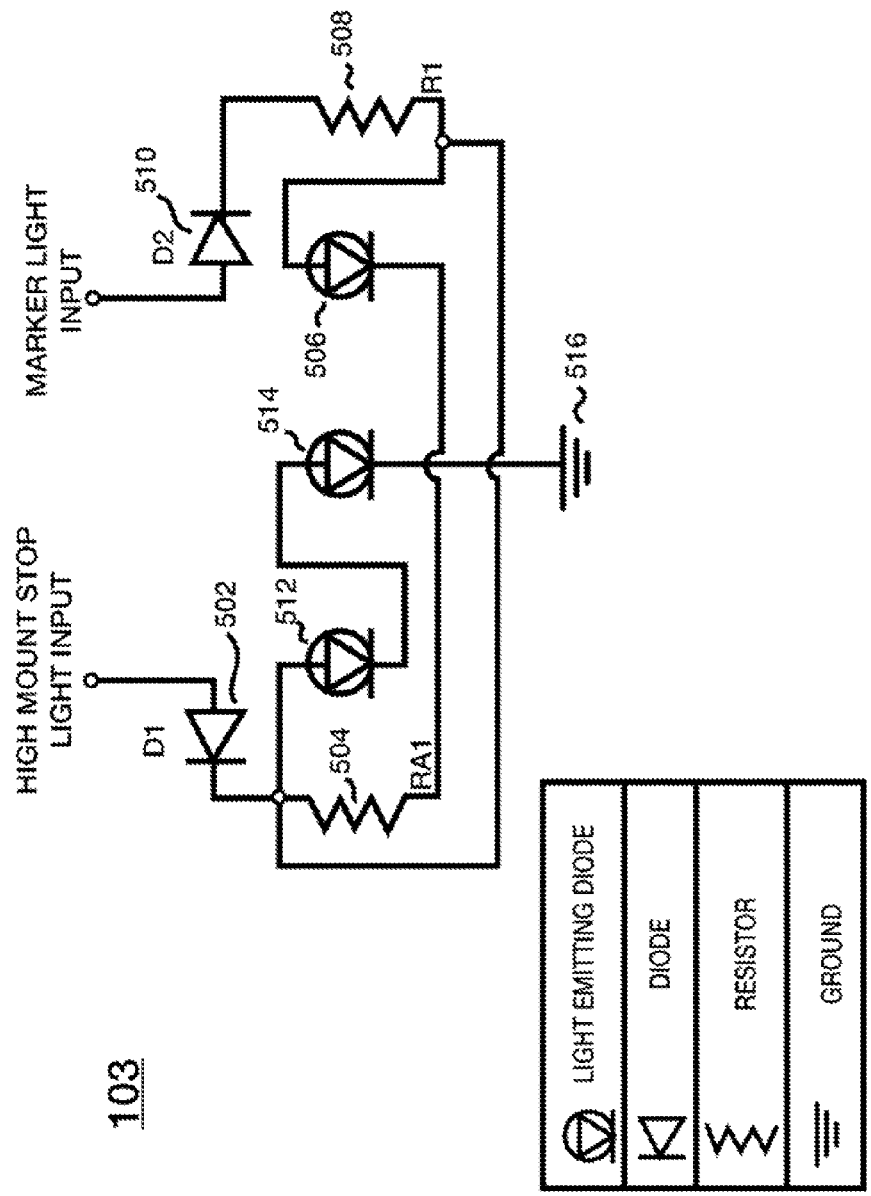
FIG. 5 illustrates a modified marker light circuitry in accordance with an exemplary embodiment of the present invention.

In FIG. 5, circuitry 103 of modified marker light 101 includes a first diode (D1) 502 coupled between first input 202 and a first resistor (RA1) 504. First resistor (RA1) 504 is coupled between first diode 502 and a first light emitting diode 506. First light emitting diode 506 is coupled between first resistor (RA1) 504 and a second resistor (R1) 508. Second resistor (R1) 508 is coupled between first light emitting diode 506, a second diode (D2) 510, and a second light emitting diode 512. Second light emitting diode 512 is coupled between first diode (D1) 502 and first resistor (RA1) 504, second resistor (R1) 508, and a third light emitting diode 514. Third light emitting diode 514 is coupled between second light emitting diode 512 and a ground 516.

An exemplary embodiment of the present invention includes modified marker light 101 including first input 202 coupled to a CHMSL, second input 204 coupled to one or more marker lights, and third input 206 coupled to ground 208; and circuit 103 associated with modified marker light 101 including: first diode (D1) 502 coupled between first input 202 and first resistor (RA1) 504; first resistor (RA1) 504 coupled between first diode 502 and first light emitting diode 506; first light emitting diode 506 coupled between first resistor (RA1) 504 and second resistor (R1) 508; second resistor (R1) 508 coupled between first light emitting diode 506, second diode (D2) 510, and second light emitting diode 512; second light emitting diode 512 coupled between first diode (D1) 502, first resistor (RA1) 504, second resistor (R1) 508, and third light emitting diode 514; and third light emitting diode 514 coupled between second light emitting diode 512 and ground 516 (or third input 208).

Figure 6:
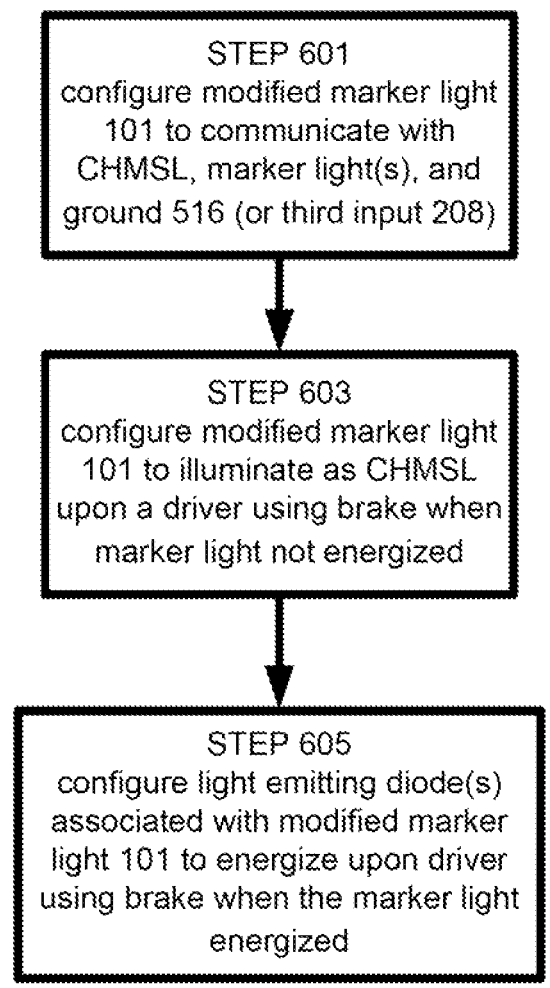
FIG. 6 is a flowchart illustrating a method in accordance with an exemplary embodiment of the present invention.

FIG. 6 is a flowchart illustrating a method in accordance with an exemplary embodiment of the present invention. The method includes configuring modified marker light 101 to communicate with a CHMSL, one or more marker lights, and ground 516 (or third input 208) (step 601); configuring modified marker light 101 to illuminate as a CHMSL upon a driver using a brake of a vehicle when the one or more marker lights are not energized (step 603); and configuring one or more light emitting diodes 506, 512, and/or 514 associated with modified marker light 101 to energize upon a driver using a brake of a vehicle when the one or more marker lights are energized (step 605).

Figure 7:
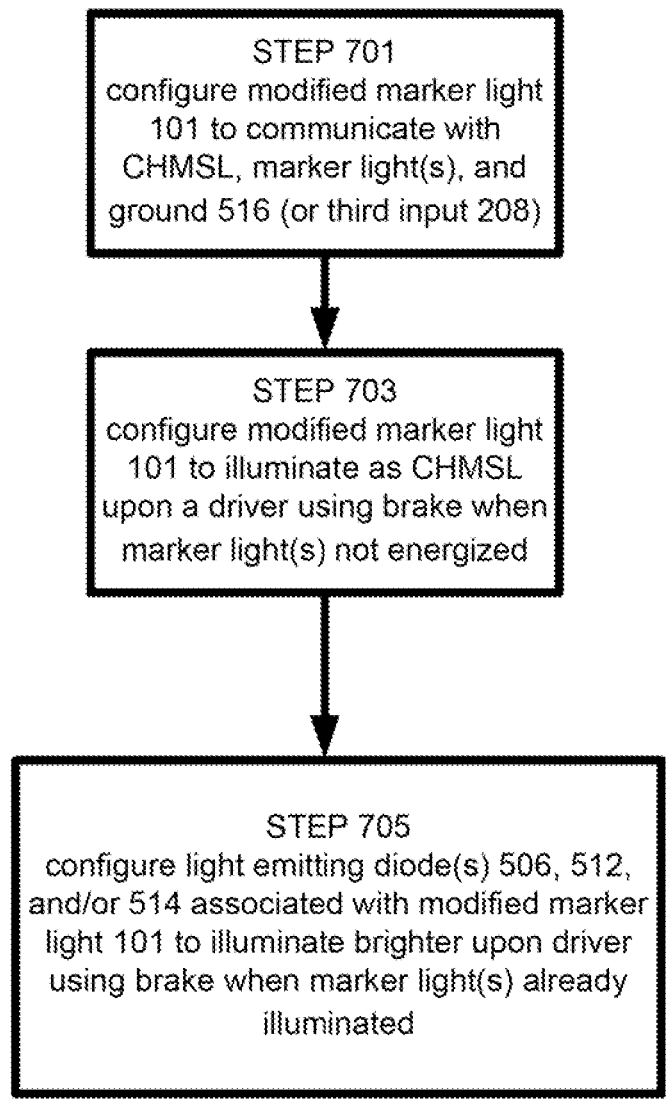
FIG. 7 is a flowchart illustrating a method in accordance with an exemplary embodiment of the present invention.

FIG. 7 is a flowchart illustrating a method in accordance with an exemplary embodiment of the present invention. The method includes configuring modified marker light 101 to communicate with a CHMSL, one or more marker lights, and a ground 516 (or third input 208) (step 701); configuring modified marker light 101 to illuminate as a CHMSL upon a driver using a brake of a vehicle when the one or more marker lights are not energized (step 703); and configuring one or more light emitting diodes 506, 512, and/or 514 associated with modified marker light 101 to illuminate brighter upon a driver using a brake of a vehicle when the one or more marker lights are already illuminated (step 705).

Figure 8:
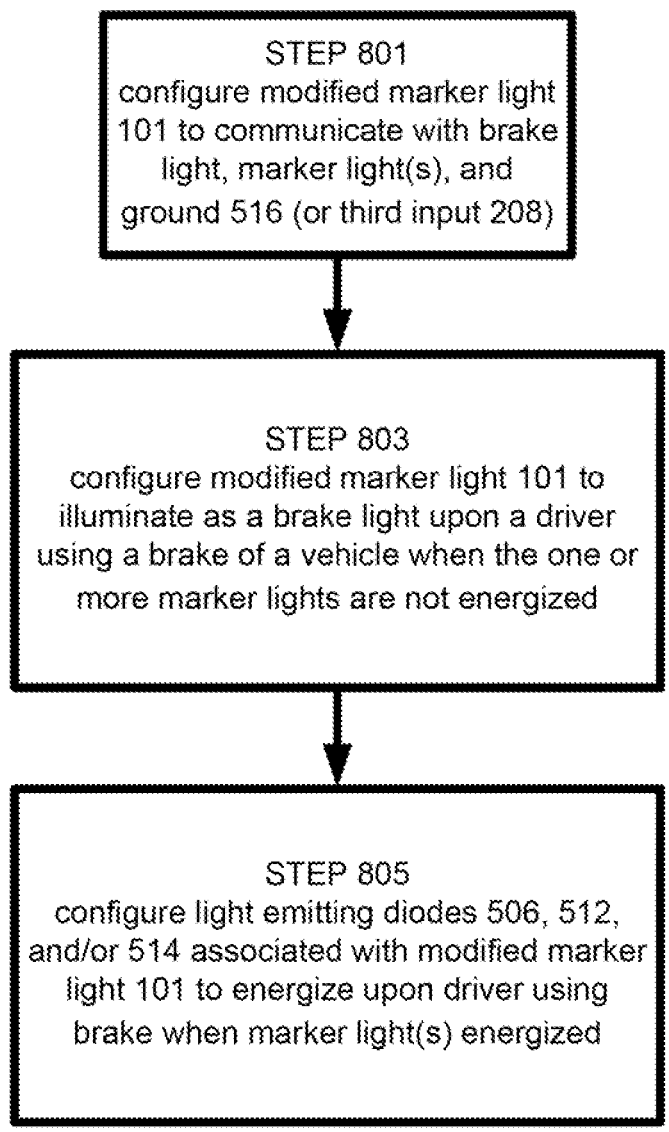
FIG. 8 is a flowchart illustrating a method in accordance with an exemplary embodiment of the present invention.

FIG. 8 is a flowchart illustrating a method in accordance with an exemplary embodiment of the present invention. The method includes configuring modified marker light 101 to communicate with a brake light of a vehicle, one or more marker lights, and ground 516 (or third input 208) (step 801); configuring modified marker light 101 to illuminate as a brake light upon a driver using a brake of a vehicle when the one or more marker lights are not energized (step 803); and configuring one or more light emitting diodes 506, 512, and/or 514 associated with modified marker light 101 to energize upon a driver using a brake of a vehicle when the one or more marker lights are energized (step 805).

Figure 9:
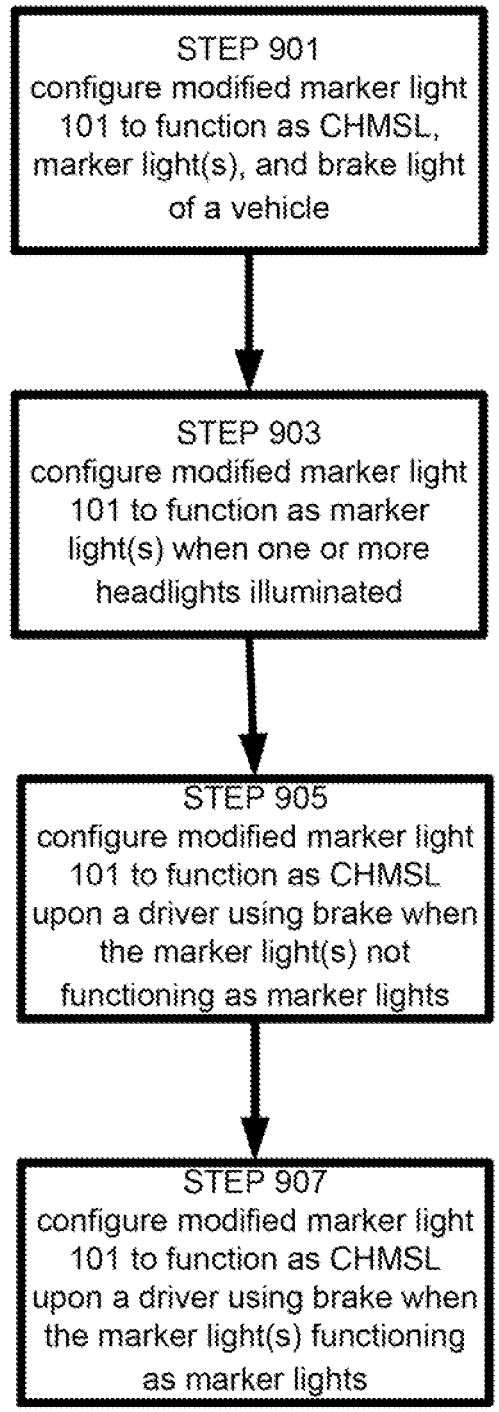
FIG. 9 is a flowchart illustrating a method in accordance with an exemplary embodiment of the present invention.

FIG. 9 is a flowchart illustrating a method in accordance with an exemplary embodiment of the present invention. The method includes configuring modified marker light 101 to function as one or more of a CHMSL, one or more marker lights, and a brake light of a vehicle (step 901); configuring modified marker light 101 to function as one or more marker lights when one or more headlights are illuminated (step 903); configuring modified marker light 101 to function as a CHMSL upon a driver using a brake of a vehicle when the one or more marker lights are not functioning as marker lights (step 905); and configuring modified marker light 101 to function as a CHMSL upon a driver using a brake of a vehicle when the one or more marker lights are functioning as marker lights (step 907).

Figure 10:
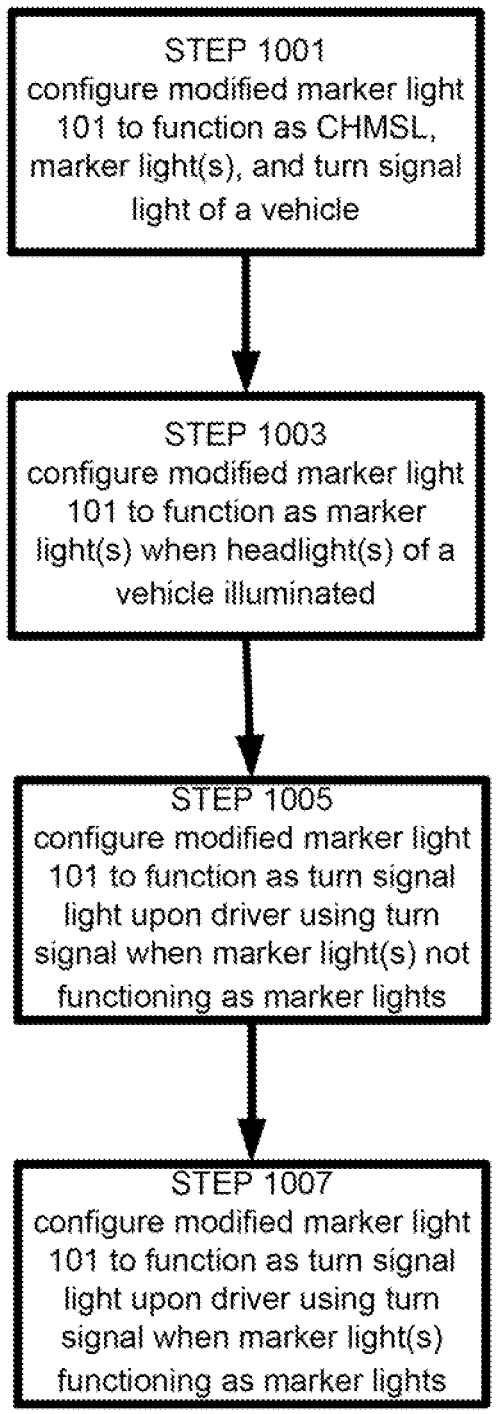
FIG. 10 is a flowchart illustrating a method in accordance with an exemplary embodiment of the present invention.

FIG. 10 is a flowchart illustrating a method in accordance with an exemplary embodiment of the present invention. The method includes configuring modified marker light 101 to function as one or more of a CHMSL, one or more marker lights, and a turn signal light of a vehicle (step 1001); configuring modified marker light 101 to function as one or more marker lights when one or more headlights of a vehicle are illuminated (step 1003); configuring modified marker light 101 to function as a turn signal light (e.g., a light that blinks on and off periodically) upon a driver using a turn signal of a vehicle when the one or more marker lights are not functioning as marker lights (step 1005); and configuring modified marker light 101 to function as a turn signal light upon a driver using a turn signal of a vehicle when the one or more marker lights are functioning as marker lights (step 1007).

Thus, the present invention includes a system, method, and apparatus for configuring one modified marker light to function as one or more of a marker light, a CHMSL, and a brake light. The modified marker light controls the function of the marker light, the CHMSL, and the brake light to provide a universal control for one modified marker light to function as multiple types of lights.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any method or process may be executed in any order and are not limited to the order presented in the method or process.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A light assembly for a vehicle comprising:
a light housing having a light source; and
an electrical circuit configured to connect to an existing illumination system of the vehicle and to energize the light source so that, when at least one headlight of the vehicle is illuminated and a vehicle brake is not applied, the light source illuminates steadily at a first brightness that is suitable for an identification lamp, whether or not a right a turn signal of the vehicle is energized and whether or not a left turn signal of the vehicle is energized;
wherein the electrical circuit is also configured to energize the light source so that, when at least one headlight of the vehicle is on and the vehicle brake is applied, the light source illuminates steadily at a second brightness that is brighter than the first brightness and that is suitable for a stop lamp, whether or not the right turn signal or the left turn signal is energized; and
wherein the light housing can be mounted on the vehicle in a location that is suitable for functioning as a center high mount stop light and is also suitable for functioning as an identification lamp.

2. The light assembly of claim 1 wherein the light source comprises a light emitting diode.

3. The light assembly of claim 1 wherein the light source comprises a light bulb.

4. The light assembly of claim 1 wherein the light source comprises a first light element coupled in series with a second light element.

5. The light assembly of claim 1 wherein the light source comprises a first light element and a second light element;
wherein the electrical circuit is configured to energize the first light element when at least one headlight of the vehicle is illuminated, whether or not the vehicle brake is applied or a turn signal of the vehicle is energized; and wherein the electrical circuit is also configured to energize the second light element when the brake is applied, whether or not the first light element is energized.

6. The light assembly of claim 5 wherein the first light element comprises a light emitting diode.

7. The light assembly of claim 5 wherein the second light element comprises a light emitting diode.

8. The light assembly of claim 5 wherein the first light element comprises a plurality of light emitting diodes and the second light element comprises a light emitting diode.

9. The light assembly of claim 5 wherein at least one of the first light element and the second light element comprises a light bulb.

10. The light assembly of claim 5 wherein the electrical circuit comprises a brake light input coupled to the first light element and an identification light input coupled to the second light element, and wherein a diode is coupled between the brake light input and the first light element.

11. The light assembly of claim 5 wherein the electrical circuit comprises a brake light input coupled to the first light element and an identification light input coupled to the second light element, and wherein a diode is coupled between the identification light input and the second light element.

12. An apparatus comprising:
a light assembly configured to connect to an existing illumination system of a vehicle and comprising a housing adapted for mounting on the vehicle, wherein the housing includes a brake light input coupled to a light source and an identification light input coupled to the light source; and
an electrical circuit configured to energize the light source so that, when at least one headlight of the vehicle is illuminated and a vehicle brake is not applied, the light source illuminates steadily at a first brightness that is suitable for an identification lamp whether or not a right turn signal input is energized and whether or not a left turn signal input is energized; and
wherein the electrical circuit is also configured to energize the light source so that, when at least one headlight of the vehicle is on and the vehicle brake is applied, the light source illuminates steadily at a second brightness that is brighter than the first brightness and that is suitable for a stop lamp, whether or not the right turn signal or the left turn signal is energized;
whereby the light assembly is configured to function as an identification light and as a center high mount stop light.

13. The apparatus of claim 12 wherein the light source comprises at least one light emitting diode.

14. The apparatus of claim 12 wherein the light source comprises a plurality of light emitting diodes.

15. An apparatus comprising:
a light assembly configured to connect to an existing illumination system of a vehicle and adapted for mounting on the vehicle and configured to include a brake light input coupled to a first light element and an identification light input coupled to a second light element; and
an electrical circuit configured to energize the second light element so that the second light element is steadily illuminated at a brightness suitable for an identification lamp when at least one headlight of the vehicle is illuminated, whether or not the first light element is energized and whether or not a right turn signal of the vehicle or a left turn signal of the vehicle is energized;

wherein the electrical circuit is also configured to energize the first light element at a brightness suitable for a stop lamp when the vehicle brake is applied, whether or not the second light element is energized and whether or not the right turn signal or the left turn signal is energized; and wherein the light assembly is mounted on the vehicle in a location that is suitable for functioning as a center high mount stop lamp and is also suitable for functioning as an identification lamp.

16. The apparatus of claim 15 wherein the first light element comprises a light emitting diode.

17. The apparatus of claim 15 wherein the second light element comprises a light emitting diode.

18. The light assembly of claim 15 wherein the first light element comprises a plurality of light emitting diodes and the second light element comprises a light emitting diode.

19. The light assembly of claim 15 wherein the first light element and the second light element are coupled in series.

20. The light assembly of claim 15 wherein a diode is coupled between the brake light input and the first light element.

21. The light assembly of claim 15 wherein a diode is coupled between the identification light input and the second light element.

* * * * *